(12) United States Patent
Zhao et al.

(10) Patent No.: US 11,818,689 B2
(45) Date of Patent: Nov. 14, 2023

(54) METHODS AND DEVICES FOR RESOURCE ALLOCATION

(71) Applicant: GUANGDONG OPPO MOBILE TELECOMMUNICATIONS CORP., LTD., Guangdong (CN)

(72) Inventors: Zhenshan Zhao, Guangdong (CN); Qianxi Lu, Guangdong (CN); Huei-Ming Lin, South Yarra (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 305 days.

(21) Appl. No.: 17/203,182

(22) Filed: Mar. 16, 2021

(65) Prior Publication Data

US 2021/0212029 A1    Jul. 8, 2021

Related U.S. Application Data

(63) Continuation of application No. PCT/CN2018/106792, filed on Sep. 20, 2018.

(51) Int. Cl.
*H04W 72/04* (2023.01)
*H04W 28/02* (2009.01)

(52) U.S. Cl.
CPC ....... *H04W 72/04* (2013.01); *H04W 28/0278* (2013.01)

(58) Field of Classification Search
None
See application file for complete search history.

(56) References Cited

U.S. PATENT DOCUMENTS

| | | | | |
|---|---|---|---|---|
| 2016/0338094 A1* | 11/2016 | Faurie | ................... | H04W 88/04 |
| 2017/0230956 A1* | 8/2017 | Kim | ..................... | H04L 5/0032 |
| 2017/0245313 A1* | 8/2017 | Kim | ..................... | H04L 1/1671 |
| 2017/0295601 A1* | 10/2017 | Kim | ..................... | H04W 72/20 |
| 2017/0353819 A1* | 12/2017 | Yin | ......................... | H04W 4/70 |
| 2018/0116007 A1* | 4/2018 | Yasukawa | ......... | H04W 72/1263 |
| 2018/0206176 A1* | 7/2018 | Panteleev | ............ | H04W 28/04 |
| 2019/0116586 A1* | 4/2019 | Basu Mallick | ....... | H04W 72/51 |
| 2019/0387377 A1* | 12/2019 | Zhang | ................. | H04W 52/383 |
| 2020/0015176 A1* | 1/2020 | Li | ......................... | H04L 1/1861 |
| 2020/0029245 A1* | 1/2020 | Khoryaev | ............. | H04W 36/22 |
| 2020/0163155 A1* | 5/2020 | Lee | ........................ | H04L 5/0053 |
| 2020/0205127 A1* | 6/2020 | Tang | ..................... | H04W 72/20 |
| 2020/0296745 A1* | 9/2020 | Inokuchi | ............. | H04W 72/566 |

(Continued)

FOREIGN PATENT DOCUMENTS

| | | |
|---|---|---|
| CN | 104703224 | 6/2015 |
| CN | 107071916 | 8/2017 |

(Continued)

OTHER PUBLICATIONS

EPO, Extended European Search Report for EP Application No. 18934152.2, dated Oct. 6, 2021.

(Continued)

*Primary Examiner* — Kenny S Lin
(74) *Attorney, Agent, or Firm* — Hodgson Russ LLP (57) ABSTRACT

Methods and devices for resource allocation are provided. The method includes the following. A first terminal receives BSR information from a second terminal. The first terminal allocates a first transmission resource to the second terminal.

20 Claims, 5 Drawing Sheets

(56) References Cited

U.S. PATENT DOCUMENTS

2020/0383114 A1* 12/2020 Zhang ............... H04W 72/0446
2021/0160819 A1* 5/2021 Kim ........................ H04L 5/001

FOREIGN PATENT DOCUMENTS

WO      2016181095     11/2016
WO      2018084949      5/2018

OTHER PUBLICATIONS

Flore, "Initial Cellular V2X standard completed," 3GPP A Global Initiative, RP-161894, Sep. 2016, 3 pages.
Huawei et al., "Discussion on sidelink resource allocation and configuration," 3GPP TSG RAN WG1 Meeting #90, R1-1712135, Aug. 2017, 6 pages.
WIPO, International Search Report for PCT/CN2018/106792, dated May 29, 2019.

\* cited by examiner

MODE 4

| SECOND TERMINAL TRANSMITS BSR INFORMATION TO FIRST TERMINAL, THE BSR INFORMATION IS USED FOR FIRST TERMINAL TO ALLOCATE FIRST TRANSMISSION RESOURCE TO THE SECOND TERMINAL | 501 |

# METHODS AND DEVICES FOR RESOURCE ALLOCATION

CROSS REFERENCE TO RELATED APPLICATION(S)

This application is a continuation of International Application No. PCT/CN2018/106792, filed on Sep. 20, 2018, the entire disclosure of which is incorporated herein by reference.

TECHNICAL FIELD

The present disclosure relates to mobile communication technology, and particularly to methods and devices for resource allocation.

BACKGROUND

A vehicle-to-everything (V2X) system is based on sidelink (SL) transmission technology of device-to-device (D2D). Different from a traditional long term evolution (LTE) system in which the communication data is received or sent through a base station, the V2X system adopts a terminal-to-terminal direct communication mode, so it has higher spectrum efficiency and lower transmission delay.

In the third generation partner project (3GPP) release 14 (Rel-14), V2X technology is standardized, and two transmission modes are defined: Mode 3 and Mode 4. In Mode 3, the SL transmission resource for the terminal is allocated by the base station. In Mode 4, the terminal determines the SL transmission resource through sensing and reservation.

In a new radio V2X (NR-V2X) system, in addition to the above Mode 3 and Mode 4, there is a need to introduce other resource allocation manners. How to realize one terminal to allocate transmission resources for other terminals is a problem to be solved.

SUMMARY

A method for resource allocation according to embodiments includes the following. A first terminal receives buffer status report (BSR) information from a second terminal. The first terminal allocates a first transmission resource to the second terminal.

A method for resource allocation includes: the second terminal transmits BSR information to the first terminal, and the BSR information is for the first terminal to allocate the first transmission resource to the second terminal.

A device for resource allocation according to embodiments includes a transceiver, at least one processor, and a memory storing instructions. The instructions, when executed by the at least one processor, cause the transceiver to: receive buffer status report (BSR) information from a terminal. The instructions, when executed by the at least one processor, cause the at least one processor to: allocate a first transmission resource to the terminal.

BRIEF DESCRIPTION OF THE ACCOMPANYING DRAWINGS

The accompanying drawings are described to provide a further understanding of the disclosure and form a part of the disclosure. The illustrative embodiments of the application and its description are provided to interpret the disclosure and do not constitute improper limitation of the disclosure. In the accompanying drawings.

DETAILED DESCRIPTION OF ILLUSTRATED EMBODIMENTS

Technical solutions in embodiments of the disclosure will be described in combination with the accompanying drawings. Obviously, the described embodiments are part of rather than all of the embodiments of the disclosure. Based on the embodiments provided herein, all other embodiments obtained by ordinary technical personnel in the art without making creative labor fall within the protection scope of the disclosure.

Technical solutions provided herein are applicable to all kinds of communication systems, examples of which include but not limited to: global system of mobile communication(GSM) system, code division multiple access (CDMA) system, wideband code division multiple access (WCDMA) system, general packet radio service (GPRS) system, long term evolution (LTE) system, LTE frequency division duplex (FDD) system, LTE time division duplex (TDD) system, universal mobile telecommunication system (UMTS), worldwide interoperability for microwave access (WiMAX) communication system, 5G system, and the like.

Figure 1:
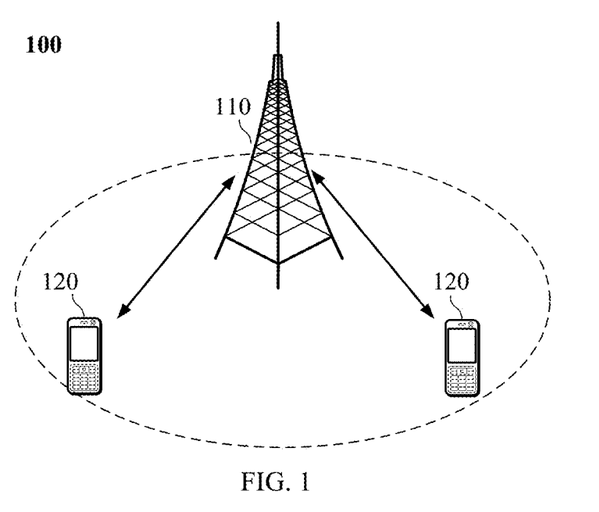
FIG. 1 is a schematic diagram illustrating a communication system architecture according to embodiments of the disclosure.

Exemplary, a communication system 100 to which the technical solutions according to embodiments is applied is illustrated in FIG. 1. As illustrated in FIG. 1, the communication system 100 includes a network device 110. The network device 110 may be a device that can communicate with a terminal device 120 (also referred to as "communication terminal" or "terminal"). The network device 110 can provide a communication coverage for a specific geographical area and communicate with terminal devices in the coverage area. The network device 110 may be a base transceiver station (BTS) in the GSM or in the CDMA system, or may be a NodeB (NB) in the WCDMA system, or may be an evolutional Node B (eNB or eNodeB) in the LTE system, or a radio controller in a cloud radio access network (CRAN). Alternatively, the network device may be a mobile switching center, a relay station, an access point, an in-vehicle device, a wearable device, a hub, a switch, a bridge, a router, a network-side device in a 5G network, or a network device in a future evolved public land mobile network (PLMN).

The communication system 100 further includes at least one terminal device 120 in the coverage area of the network device 110. The "terminal device" referred to herein can include but is not limited to a device configured to communicate via a wired line, another data connection/network, and/or a wireless interface, a device which is part of another terminal device and configured to receive/transmit communication signals, or an Internet of things (IoT) device. Examples of the wired line may include, but are not limited to, a public switched telephone network (PSTN), a digital subscriber line (DSL), a digital cable, a direct connection cable. Examples of the wireless interface may include, but are not limited to, a wireless interface for a cellular network, a wireless local area network (WLAN), a digital television network (such as a digital video broadcasting-handheld (DVB-H) network), a satellite network, an amplitude modulation-frequency modulation (AM-FM) broadcast transmitter. A terminal device configured to communicate via a wireless interface may be called a "wireless communication terminal", a "wireless terminal", and/or a "mobile terminal". Examples of a mobile terminal may include, but are not limited to, a satellite telephone or cellular telephone, a personal communication system (PCS) terminal integrated with functions of cellular radio telephone, data processing, fax, and/or data communication, a personal digital assistant (PDA) equipped with radio telephone, pager, Internet/Intranet access, web browsing, notebook, calendar, and/or global positioning system (GPS) receiver, and/or a conventional laptop, a handheld receiver, or other electronic devices equipped with radio telephone receiver. The terminal device may refer to an access terminal, a user equipment (UE), a subscriber unit, a subscriber station, a mobile station, a remote station, a remote terminal, a mobile device, a user terminal, a terminal, a wireless communication device, a user agent, or a user device. The access terminal may be a cellular radio telephone, a cordless telephone, a session initiation protocol (SIP) telephone, a wireless local loop (WLL) station, a PDA, a handheld device with wireless communication functions, a computing device, other processing devices coupled with a wireless modem, an in-vehicle device, a wearable device, a terminal device in the 5G network, a terminal device in the future evolved PLMN, etc.

As an example, terminal devices 120 can communicate with each other through device to device (D2D) communication.

As an example, the 5G system or 5G network can also be referred to as an NR system or NR network.

FIG. 1 exemplarily illustrates one network device and two terminal devices. The communication system 100 may also include multiple network devices, and there can be other numbers of terminal devices in a coverage area of each of the network devices, which is not limited herein.

The communication system 100 may further include other network entities such as a network controller, a mobile management entity, or the like, and the disclosure is not limited in this regard.

According to embodiments, a device with communication functions in a network/system can be referred to as a "communication device". Taking the communication system 100 illustrated in FIG. 1 as an example, the communication device may include the network device 110 and the terminal device(s) 120 that have communication functions. The network device 110 and the terminal device(s) 120 can be the devices described above and will not be repeated herein. The communication device may further include other devices such as a network controller, a mobile management entity, or other network entities in the communication system 100, the disclosure is not limited in this regard.

The terms "system" and "network" are often used interchangeably. The term "and/or" used herein refers to an association relationship between associated objects. For example, the expression "A and/or B" may represent the following three situations: A alone, B alone, A and B both exist.

To facilitate the understanding of the technical solutions of embodiments, Mode 3 and Mode 4 in the V2X are explained below.

Figure 2:
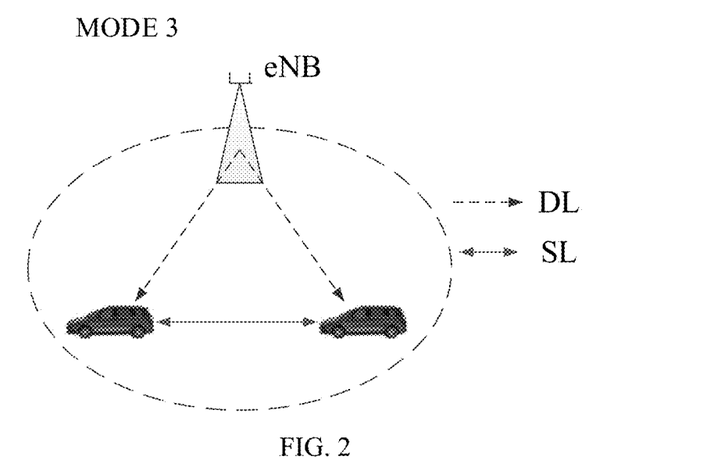
FIG. 2 illustrates Mode 3 in a V2X system.

Mode 3: as illustrated in FIG. 2, the SL transmission resource for a vehicle terminal is allocated by a base station (e.g. evolved NodeB (eNB) in LTE). Specifically, the base station transmits a control message indicating grant resources to the vehicle terminal through the downlink (DL) link. Then the vehicle terminal transmits data on the SL according to the resource allocated by the base station. In Mode 3, the base station can allocate a single transmission resource to the vehicle terminal, alternatively, the base station can allocate a semi-static transmission resource to the terminal.

Figure 3:
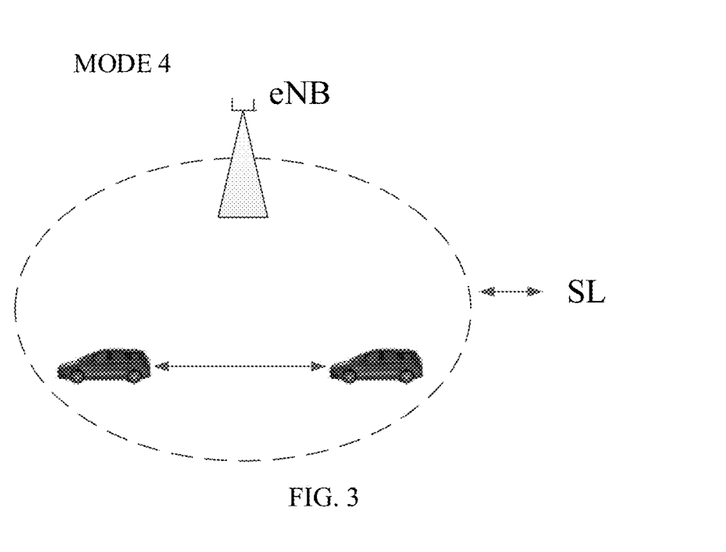
FIG. 3 illustrates Mode 4 in a V2X system.

Mode 4: As illustrated in FIG. 3, the vehicle terminal acquires the SL transmission resource by means of sensing and reservation. The vehicle terminal acquires an available transmission resource set from a resource pool by means of sensing, and selects randomly from the transmission resource set a resource for SL data transmission. Due to the cyclical characteristics of the business in the V2X system, the vehicle terminal usually adopts the semi-static transmission mode, that is, after the vehicle terminal selects a transmission resource, it will continue to use the resource in multiple transmission cycles, so as to reduce the probability of resource reselection and resource conflict. The vehicle terminal will carry information on reserved resource for next transmission in the control information for the present transmission, so that other terminals can determine whether this resource is reserved and used by the vehicle terminal by detecting the control information of the vehicle terminal, so as to achieve the purpose of reducing resource conflict.

In NR-V2X, it is necessary to support automatic driving, so higher requirements are put forward for data interaction between vehicles, such as higher throughput, lower delay, higher reliability, greater coverage, more flexible resource allocation, etc.

In addition, NR-V2X needs to support various transmission modes, such as unicast, groupcast, and broadcast.

It should be noted that in LTE-V2X, Mode 3 means that the transmission resource for the vehicle terminal is allocated by the base station, while Mode 4 means that the transmission resource for the vehicle terminal is independently selected by the terminal. In NR-V2X, other resource allocation methods can be introduced, for example, one terminal allocates transmission resources to other terminals. For example, in groupcast communication, one terminal acts as a group head, and other terminals act as group members, in this case, the group head can allocate SL transmission resources to the group members. In the group, the group head can allocate transmission resource to the group members for data transmission between the group head and the group members or data transmission between one group member and other group members.

In Mode 3, before the network allocates the UL transmission resource/SL transmission resource, the terminal needs to report a scheduling request (SR) and buffer status report (BSR), and the network will allocate appropriate transmission resource for the terminal according to the BSR reported. In SL transmission, if a first terminal allocates transmission resources to a second terminal, the second terminal also needs to report SR and BSR to the first terminal, or the second terminal can report BSR to the first terminal directly.

Figure 4:
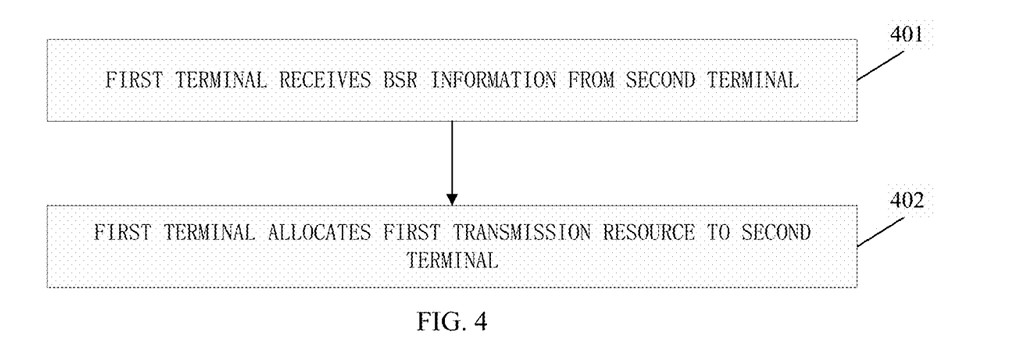
FIG. 4 is a schematic flowchart illustrating a method for resource allocation according to embodiments of the disclosure.

FIG. 4 is a schematic flow chart illustrating the method for resource allocation according to implementations. As illustrated in FIG. 4, the method begins at block 401.

At block 401, a first terminal receives BSR information from a second terminal.

The first terminal and the second terminal can be a mobile phone, a tablet computer, a vehicle terminal, a wearable device, a notebook, and other devices that can communicate with the network. The first terminal and the second terminal can be of the same type or different types. For example, the first terminal is a mobile phone and the second terminal is a vehicle terminal. Still another example, the first terminal is vehicle terminal A and the second terminal is vehicle terminal B.

The first terminal can be a group head in groupcast communication and the second terminal can be a group member in groupcast communication, this disclosure is not particularly limited in this regard. The method achieved through the first terminal is also applicable to a road side unit (RSU), and the first transmission resource can be allocated to the second terminal through the RSU.

According to implementations, the first terminal and the second terminal can communicate with each other directly. Specifically, the first terminal receives a first SL transmission channel which is transmitted by the second terminal, where the BSR information is carried by the first SL transmission channel.

The first SL transmission channel can be a first SL control channel or a first SL data channel. The first SL control channel can be a physical SL control channel (PSCCH). The first SL data channel can be a physical SL shared channel (PSSCH). The first SL control channel and the first SL data channel will be described below in detail respectively. It should be noted that technical schemes provide herein is also applicable to other types of SL transmission channel. For example, the first SL transmission channel is a SL feedback channel and the BSR information is carried by the SL feedback channel. This disclosure is not limited thereto.

1) The first SL transmission channel is the first SL control channel, and the BSR information is carried by first SL control information that is carried in the first SL control channel.

Here, the first SL control channel is used to transmit first SL control information, and the first SL control information is for example SL control information (SCI). The first SL control information mainly contains scheduling information, such as time frequency resource information, modulation-and-coding scheme (MCS) information, and the like of a PSSCH scheduled by a PSCCH. In scheme 1), the BSR information is carried by SCI in the PSCCH.

Optionally, the first SL control information carries a first information field. The first information field is for indicating that the first SL control information carries the BSR information.

Optionally, the first SL control information carries a second information field. The second information field is for indicating the BSR information.

Considering that the SCI in the PSCCH carries the BSR information, it is necessary to add an information field, namely the second information field, in the SCI. The second information field is indicative of the BSR information. Furthermore, considering that different SCI formats carry different contents, it is necessary to add another information field, namely the first information field, in the SCI. The first information field is for indicating that the first SL control information carries the BSR information. For example, 1 bit information is set in the SCI, the bit of 0 indicates that the SCI is for PSSCH scheduling, while the bit of 1 indicates that the SCI is for transmitting the BSR information.

In scheme 1), the second terminal transmits BSR information to the first terminal through the first SL control channel. The second terminal may transmit SR information to the first terminal in the following manners.

1.1) The second terminal transmits SR information to the first terminal through the first SL control channel.

The first SL control information carries a fourth information field, which is indicative of the SR information. Furthermore, the first SL control information carries a third information field, which is for indicating that the first SL control information carries the SR information.

For instance, considering that the SCI in the PSCCH carries the SR information, it is necessary to add an information field, namely the fourth information field, in the SCI. The fourth information field is indicative of the SR information. Furthermore, considering that different SCI formats carry different contents, it is necessary to add another information field, namely the third information field, in the SCI. The third information field is for indicating that the first SL control information carries the SR information. For example, 1 bit information is set in the SCI, the bit of 0 indicates that the SCI is for PSSCH scheduling, while the bit of 1 indicates that the SCI is for transmitting the SR information.

According to embodiments, the first SL control information carries both the SR information and the BSR information.

For example, since the SCI is for transmitting SR information, BSR information, and scheduling information for the PSSCH, a two bits field can be included in the SCI. The field of 00 indicates that the SCI is for PSSCH scheduling, the field of 01 indicates that the SCI is for transmitting SR information, and the field of 10 indicates that the SCI is for transmitting BSR information.

1.2) The second terminal transmits SR information to the first terminal through a second SL transmission channel.

Here, the second SL transmission channel can be a second SL control channel, a second SL data channel, or a first sequence.

In one embodiment, the second SL transmission channel is a second SL control channel. The SR information is carried by second SL control information in the second SL control channel.

Optionally, the second SL control information carries a fifth information field. The fifth information field is for indicating that the second SL control information carries the SR information.

Optionally, the second SL control information carries a sixth information field. The sixth information field is indicative of the SR information.

The second SL control information is different from the first SL control information. The first SL control information is assumed to be PSCCH 1 and the second SL control information is assumed to be PSCCH 2. The SCI in PSCCH 1 carries the BSR information, and the SCI in PSCCH 2 carries the SR information.

For the same reason, it is necessary to add an information field, namely the sixth information field, in the SCI in PSCCH 2. The sixth information field is indicative of the SR information. Furthermore, considering that different SCI formats carries different contents, it is necessary to add another information field, namely the fifth information field, in the SCI in PSCCH 2. The fifth information field is for indicating that the SCI in PSCCH 2 carries the SR information. For example, one bit information is included in the SCI, where the bit of 0 indicates that the SCI is for PSSCH scheduling, and the bit of 1 indicates that the SCI is for transmitting SR information.

In one embodiment, the second SL transmission channel is a second SL data channel, and the SR information is carried by data in the second SL data channel.

In one embodiment, the second SL transmission channel is a first sequence, and the first sequence is indicative of the SR information.

The first sequence is generated based on at least one of: identity (ID) information of the first terminal, ID information of the second terminal, or group ID information of a group to which the first terminal and the second terminal belong.

Here, if the first terminal detects existence of the first sequence through sequence detection, the first terminal can determine that SR information is detected. For example, based on a locally generated sequence, the first terminal performs a correlation operation on a signal received. If a peak value of the correlation operation exceeds a threshold, the first terminal determines that (existence of) the SR information is detected, otherwise, the first terminal determines that no SR information is detected. The threshold can be predefined, preconfigured, or network configured.

2) The first SL transmission channel is a first SL data channel, and the BSR information is carried by data that is carried in the first SL data channel.

Here, the first SL data channel is for transmitting data. For instance, the BSR information can be carried by the first SL data channel as data.

In scheme 2), the second terminal transmits the BSR information to the first terminal through the first SL data channel. The second terminal transmits the SR information to the first terminal in the following manners.

2.1) The second terminal transmits the SR information to the first terminal through the first SL data channel.

Here, the first SL data channel carries both SR information and BSR information.

2.2) The second terminal transmits the SR information to the first terminal through a second SL transmission channel.

Here, the second SL transmission channel can be a second SL control channel, a second SL data channel, or a first sequence.

In one embodiment, the second SL transmission channel is the second SL control channel, and the SR information is carried by the second SL control information in the second SL control channel.

Optionally, the second SL control information carries a fifth information field. The fifth information field is for indicating that the second SL control information carries the SR information.

Optionally, the second SL control information carries a sixth information field. The sixth information field is indicative of the SR information.

For instance, the second SL control channel is assumed to be a PSCCH, then the SR information is carried by the SCI in the PSCCH.

For the same reason, it is necessary to add an information field, namely the sixth information field, in the SCI in the PSCCH. The sixth information field is indicative of the SR information. Furthermore, considering that different SCI formats carries different contents, it is necessary to add another information field, namely the fifth information field, in the SCI in the PSCCH. The fifth information field is for indicating that the SCI in the PSCCH carries the SR information. For example, one bit information is included in the SCI, where the bit of 0 indicates that the SCI is for PSSCH scheduling, and the bit of 1 indicates that the SCI is for transmitting SR information.

In another embodiment, the second SL transmission channel is the second SL data channel, and the SR information is carried by data in the second SL data channel.

In still another embodiment, the second SL transmission channel is the first sequence, and the first sequence is indicative of the SR information.

The first sequence is generated based on at least one of: identity (ID) information of the first terminal, ID information of the second terminal, or group ID information of a group to which the first terminal and the second terminal belong.

Here, if the first terminal detects existence of the first sequence through sequence detection, the first terminal can determine that SR information is detected. For example, based on a locally generated sequence, the first terminal performs a correlation operation on a signal received. If a peak value of the correlation operation exceeds a threshold, then the first terminal determines that (existence of) the SR information is detected, otherwise, the first terminal determines that no SR information is detected. The threshold can be predefined, preconfigured, or network configured.

Here, the first SL transmission channel is transmitted on a second transmission resource. Specifically, the first terminal determines the second transmission resource, and receives, on the second transmission resource, the first SL transmission channel transmitted by the second terminal.

The first terminal determines the second transmission resource as follows. The first terminal determines the second transmission resource according to pre-configuration information. Or, the first terminal determines the second transmission resource according to network configuration information. Or, the first terminal determines the second transmission resource according to resource configuration information received from a third terminal. Or, the first terminal determines a transmission resource, which is allocated to the second terminal according to SR information received from the second terminal, as the second transmission resource.

For example, if both the first terminal and the second terminal are in a cell, then a network device can allocate the second transmission resource to the second terminal. The second transmission resource is for the second terminal to transmit the first SL transmission channel to the first terminal. The network device can transmit information of the second transmission resource to the second terminal. Therefore, the first terminal can receive, on the second transmission resource specified by the network device, the first SL transmission channel transmitted by the second terminal.

Still another example, the first terminal, the second terminal, and the third terminal constitutes a first transmission group, where the third terminal is a group head of the group, the first terminal and the second terminal are group members of the group. The third terminal can allocate the second transmission resource to group members such as the second terminal, and transmit information regarding the second transmission resource to the first terminal. Therefore, the second terminal can transmit the first SL transmission channel on the second transmission resource and the first terminal can receive the first SL transmission channel on the second transmission resource.

Still another example, the second terminal transmits SR information to the first terminal, and according to the SR information received from the second terminal, the first terminal allocates a resource for BSR information transmission to the second terminal, the resource thus allocated is the second transmission resource. The second terminal transmits, on the second transmission resource, the first SL transmission channel, and the BSR information is carried by the first SL transmission channel. The first terminal receives, on the second transmission resource, the first SL transmission channel transmitted by the second terminal.

At block 402, the first terminal allocates a first transmission resource to the second terminal.

In one embodiment, the SL transmission resource is allocated by the network. The first terminal transmits the BSR to the network, receives from the network the SL resource allocation information, and allocates the first transmission resource to the second terminal based on the SL resource allocation information.

In one embodiment, the SL transmission resource is determined by the terminal independently. The first terminal allocates the first transmission resource to the second terminal based on the BSR. Specifically, the first terminal allocates the first transmission resource to the second terminal from a transmission resource set based on the BSR. The transmission resource set is preconfigured or network configured, or is obtained by the first terminal through sensing.

Here, the BSR information reported to the first terminal by the second terminal is for indicating the amount of data to be transmitted by one or several logical channel groups of the second terminal, and the second terminal hopes that the network side or the first terminal can allocate some transmission resources to the second terminal.

In one embodiment, when the second terminal transmits the BSR information to the first terminal to request transmission resources, the second terminal can transmit first information to the first terminal to assist the first terminal in resource scheduling. Specifically, the first terminal receives the first information from the second terminal, where the first information includes at least one of: channel quality indicator (CQI), channel state information (CSI), modulation and coding scheme (MCS), or candidate transmission resource indicator. The candidate transmission resource indicator is indicative of available transmission resource that is in a first resource selection window. The first terminal allocates the first transmission resource to the second terminal based on the BSR information and the first information.

In the above scheme, if the first transmission resource allocated to the second terminal is for SL data transmission between the second terminal and the first terminal, the CQI and/or the CSI refers to channel quality between the second terminal and the first terminal. On the other hand, if the first transmission resource allocated to the second terminal is for SL data transmission between the second terminal and a third terminal, the CQI and/or the CSI refers to channel quality between the second terminal and the third terminal.

The first resource selection window is determined as follows. The first terminal determines the first resource selection window according to pre-configuration information. Or, the first terminal determines the first resource selection window according to network configuration information. Or, the first terminal determines the first resource selection window according to configuration information received from a third terminal.

The pre-configuration information, the network configuration information, or the configuration information received from the third terminal may include at least one of: resource size of each transmission resource in the first resource selection window, time domain start position information of the first resource selection window, time domain end position information of the first resource selection window, time domain length information of the first resource selection window, frequency domain start position information of the first resource selection window, frequency domain end position information of the first resource selection window, frequency domain length information of the first resource selection window.

Considering that in SL transmission, the interference environment around each terminal is different, the available transmission resource sensed by the second terminal may be different from the available transmission resource sensed by the first terminal. In order to assist the first terminal in resource allocation, the second terminal may indicate to the first terminal one or more available resources sensed by the second terminal. For instance, the second terminal transmits a candidate transmission resource indicator to the first terminal, where the candidate transmission resource indicator is indicative of one or more available transmission resource.

Optionally, the candidate transmission resource indicator is indicative of the quantity of available transmission resources, time-frequency position information of each available transmission resource, and the like.

Optionally, the one or more available resources are those selected in the first resource selective window. The first resource selection window is determined according to pre-configuration information, network configuration information, or configuration information received from a third terminal.

Optionally, some or all of parameters of the first resource selection window are configured by the first terminal, the network, or other devices, or are preconfigured.

In the above scheme, the first information can be carried by a third SL transmission channel. That is, the first terminal receives the third SL transmission channel transmitted by the second terminal, where the first information is carried by the third SL transmission channel. The third SL transmission channel may be different from or the same as the first SL transmission channel.

Figure 5:
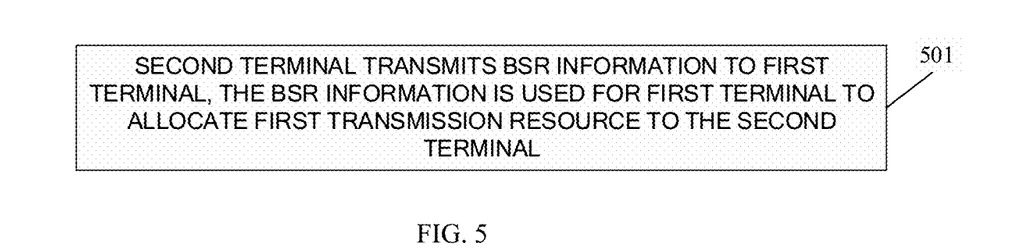
FIG. 5 is another schematic flowchart illustrating a method for resource allocation according to embodiments of the disclosure.

FIG. 5 is another schematic flow chart illustrating a method for resource allocation according to embodiments. As illustrated in FIG. 5, the method for resource allocation begins at block 501.

At block 501, a second terminal transmits BSR information to a first terminal, the BSR information is used for the first terminal to allocate a first transmission resource to the second terminal.

The first terminal and the second terminal can be a mobile phone, a tablet computer, a vehicle terminal, a wearable device, a notebook, and other devices that can communicate with the network. The first terminal and the second terminal can be of the same type or different types. For example, the first terminal is a mobile phone and the second terminal is a vehicle terminal. Still another example, the first terminal is vehicle terminal A and the second terminal is vehicle terminal B.

The first terminal can be a group head in groupcast communication and the second terminal can be a group member in groupcast communication, this disclosure is not particularly limited. The method achieved through the first terminal is also applicable to a road side unit (RSU), and the first transmission resource can be allocated to the second terminal through the RSU.

The first terminal and the second terminal can communicate with each other directly. Specifically, the second terminal transmits a first SL transmission channel to the first terminal, and the BSR information is carried by the first SL transmission channel.

The first SL transmission channel can be a first SL control channel or a first SL data channel. The first SL control channel can be a PSCCH. The first SL data channel can be a PSSCH. The first SL control channel and the first SL data channel will be described below in detail respectively. It should be noted that technical schemes provide herein is also applicable to other types of SL transmission channel. For example, the first SL transmission channel is a SL feedback channel and the BSR information is carried by the SL feedback channel. This disclosure is not limited thereto.

1) The first SL transmission channel is the first SL control channel, and the BSR information is carried by first SL control information that is carried in the first SL control channel.

Here, the first SL control channel is used to transmit first SL control information, and the first SL control information is for example SCI. The first SL control information mainly contains scheduling information, such as time frequency resource information, MCS information, and the like of a PSSCH scheduled by a PSCCH. In scheme 1), the BSR information is carried by the SCI in the PSCCH.

Optionally, the first SL control information carries a first information field. The first information field is for indicating that the first SL control information carries the BSR information.

Optionally, the first SL control information carries a second information field. The second information field is for indicating the BSR information.

Considering that the SCI in the PSCCH carries the BSR information, it is necessary to add an information field, namely the second information field, in the SCI. The second information field is indicative of the BSR information. Furthermore, considering that different SCI formats carry different contents, it is necessary to add another information field, namely the first information field, in the SCI. The first information field is for indicating that the first SL control information carries the BSR information. For example, 1 bit information is set in the SCI, the bit of 0 indicates that the SCI is for PSSCH scheduling, while the bit of 1 indicates that the SCI is for transmitting the BSR information.

In scheme 1), the second terminal transmits BSR information to the first terminal through the first SL control channel. The second terminal may transmit SR information to the first terminal in the following manners.

1.1) The second terminal transmits SR information to the first terminal through the first SL control channel.

The first SL control information carries a fourth information field, which is indicative of the SR information. Furthermore, the first SL control information carries a third information field, which is for indicating that the first SL control information carries the SR information.

For instance, considering that the SCI in the PSCCH carries the SR information, it is necessary to add an information field, namely the fourth information field, in the SCI. The fourth information field is indicative of the SR information. Furthermore, considering that different SCI formats carry different contents, it is necessary to add another information field, namely the third information field, in the SCI. The third information field is for indicating that the first SL control information carries the SR information. For example, 1 bit information is set in the SCI, the bit of 0 indicates that the SCI is for PSSCH scheduling, while the bit of 1 indicates that the SCI is for transmitting the SR information.

According to embodiments, the first SL control information carries both the SR information and the BSR information.

For example, since the SCI is for transmitting SR information, BSR information, and scheduling information for the PSSCH, a two bits field can be included in the SCI. The field of 00 indicates that the SCI is for PSSCH scheduling, the field of 01 indicates that the SCI is for transmitting SR information, and the field of 10 indicates that the SCI is for transmitting BSR information.

1.2) The second terminal transmits a second SL transmission channel to the first terminal, where the SR information is carried by the second SL transmission channel.

Here, the second SL transmission channel can be a second SL control channel, a second SL data channel, or a first sequence.

In one embodiment, the second SL transmission channel is a second SL control channel. The SR information is carried by second SL control information in the second SL control channel.

Optionally, the second SL control information carries a fifth information field. The fifth information field is for indicating that the second SL control information carries the SR information.

Optionally, the second SL control information carries a sixth information field. The sixth information field is indicative of the SR information.

The second SL control information is different from the first SL control information. The first SL control information is assumed to be PSCCH 1 and the second SL control information is assumed to be PSCCH 2. The SCI in PSCCH 1 carries the BSR information, and the SCI in PSCCH 2 carries the SR information.

For the same reason, it is necessary to add an information field, namely the sixth information field, in the SCI in PSCCH 2. The sixth information field is indicative of the SR information. Furthermore, considering that different SCI formats carries different contents, it is necessary to add another information field, namely the fifth information field, in the SCI in PSCCH 2. The fifth information field is for indicating that the SCI in PSCCH 2 carries the SR information. For example, one bit information is included in the SCI, where the bit of 0 indicates that the SCI is for PSSCH scheduling, and the bit of 1 indicates that the SCI is for transmitting SR information.

In one embodiment, the second SL transmission channel is a second SL data channel, and the SR information is carried by data in the second SL data channel.

In one embodiment, the second SL transmission channel is a first sequence, and the first sequence is indicative of the SR information.

The first sequence is generated based on at least one of: identity (ID) information of the first terminal, ID information of the second terminal, or group ID information of a group to which the first terminal and the second terminal belong.

Here, if the first terminal detects existence of the first sequence through sequence detection, the first terminal can determine that SR information is detected. For example, based on a locally generated sequence, the first terminal performs a correlation operation on a signal received. If a peak value of the correlation operation exceeds a threshold, the first terminal determines that (existence of) the SR information is detected, otherwise, the first terminal determines that no SR information is detected. The threshold can be predefined, preconfigured, or network configured.

2) The first SL transmission channel is a first SL data channel, and the BSR information is carried by data that is carried in the first SL data channel.

Here, the first SL data channel is for transmitting data. For instance, the BSR information can be carried by the first SL data channel as data.

In scheme 2), the second terminal transmits the BSR information to the first terminal through the first SL data channel. The second terminal transmits the SR information to the first terminal in the following manners.

2.1) The second terminal transmits the SR information to the first terminal through the first SL data channel.

Here, the first SL data channel carries both SR information and BSR information.

2.2) The second terminal transmits the SR information to the first terminal through a second SL transmission channel.

Here, the second SL transmission channel can be a second SL control channel, a second SL data channel, or a first sequence.

In one embodiment, the second SL transmission channel is the second SL control channel, and the SR information is carried by the second SL control information in the second SL control channel.

Optionally, the second SL control information carries a fifth information field. The fifth information field is for indicating that the second SL control information carries the SR information.

Optionally, the second SL control information carries a sixth information field. The sixth information field is indicative of the SR information.

For instance, the second SL control channel is assumed to be a PSCCH, then the SR information is carried by the SCI in the PSCCH.

For the same reason, it is necessary to add an information field, namely the sixth information field, in the SCI in the PSCCH. The sixth information field is indicative of the SR information. Furthermore, considering that different SCI formats carries different contents, it is necessary to add another information field, namely the fifth information field, in the SCI in the PSCCH. The fifth information field is for indicating that the SCI in the PSCCH carries the SR information. For example, one bit information is included in the SCI, where the bit of 0 indicates that the SCI is for PSSCH scheduling, and the bit of 1 indicates that the SCI is for transmitting SR information.

In another embodiment, the second SL transmission channel is the second SL data channel, and the SR information is carried by data in the second SL data channel.

In still another embodiment, the second SL transmission channel is the first sequence, and the first sequence is indicative of the SR information.

The first sequence is generated based on at least one of: identity (ID) information of the first terminal, ID information of the second terminal, or group ID information of a group to which the first terminal and the second terminal belong.

Here, if the first terminal detects existence of the first sequence through sequence detection, the first terminal can determine that SR information is detected. For example, based on a locally generated sequence, the first terminal performs a correlation operation on a signal received. If a peak value of the correlation operation exceeds a threshold, then the first terminal determines that (existence of) the SR information is detected, otherwise, the first terminal determines that no SR information is detected. The threshold can be predefined, preconfigured, or network configured.

Here, the first SL transmission channel is transmitted on a second transmission resource. Specifically, the second terminal determines the second transmission resource and transmits, on the second transmission resource, the first SL transmission channel to the first terminal.

The second terminal determines the second transmission resource as follows. The second terminal selects the second transmission resource independently. Or, the second terminal determines the second transmission resource according to pre-configuration information. Or, the second terminal determines the second transmission resource according to network configuration information. Or, the second terminal determines the second transmission resource according to resource configuration information received from a third terminal. Or, the second terminal determines a transmission resource, which is allocated to the first terminal according to SR information received from the first terminal, as the second transmission resource.

The second terminal can select the second transmission resource independently as follows. The second terminal selects a resource from a resource pool as the second transmission resource by sensing. Or, the second terminal selects a resource as the second transmission resource randomly. Or, the second terminal selects a resource from a resource pool as the second transmission resource in a predefined or preconfigured manner. For example, the second terminal determines the second transmission resource from the resource pool according to the ID information of the second terminal.

For example, if both the first terminal and the second terminal are in a cell, then a network device can allocate the second transmission resource to the second terminal. The second transmission resource is for the second terminal to transmit the first SL transmission channel to the first terminal. The network device can transmit information of the second transmission resource to the second terminal. Therefore, the first terminal can receive, on the second transmission resource specified by the network device, the first SL transmission channel transmitted by the second terminal.

Still another example, the first terminal, the second terminal, and the third terminal constitutes a first transmission group, where the third terminal is a group head of the group, the first terminal and the second terminal are group members of the group. The third terminal can allocate the second transmission resource to group members such as the second terminal, and transmit information of the second transmission resource to the first terminal. Therefore, the second terminal can transmit the first SL transmission channel on the second transmission resource and the first terminal can receive the first SL transmission channel on the second transmission resource.

Still another example, the second terminal transmits SR information to the first terminal, and according to the SR information received from the second terminal, the first terminal allocates a resource for BSR information transmission to the second terminal, the resource thus allocated is the second transmission resource. The second terminal transmits, on the second transmission resource, the first SL transmission channel and the BSR information is carried by the first SL transmission channel. The first terminal receives, on the second transmission resource, the first SL transmission channel transmitted by the second terminal.

Here, the BSR information reported to the first terminal by the second terminal is for indicating the amount of data to be transmitted by one or several logical channel groups of the second terminal, and the second terminal hopes that the network side or the first terminal can allocate some transmission resources to the second terminal.

In one embodiment, the SL transmission resource is allocated by the network. The first terminal transmits the BSR to the network, receives from the network the SL resource allocation information, and allocates the first transmission resource to the second terminal based on the SL resource allocation information.

In one embodiment, the SL transmission resource is determined by the terminal independently. The first terminal allocates the first transmission resource to the second terminal based on the BSR. Specifically, the first terminal allocates the first transmission resource to the second terminal from a transmission resource set based on the BSR. The transmission resource set is preconfigured or network configured, or is obtained by the first terminal through sensing.

In one embodiment, when the second terminal transmits the BSR information to the first terminal to request transmission resources, the second terminal can transmit first information to the first terminal to assist the first terminal in resource scheduling. Specifically, the second terminal transmits the first information to the second terminal, where the first information includes at least one of: CQI, CSI, MCS, or candidate transmission resource indicator. The candidate transmission resource indicator is indicative of available transmission resource that is in a first resource selection window. The first terminal allocates the first transmission resource to the second terminal based on the BSR information and the first information.

In the above scheme, if the first transmission resource allocated to the second terminal is for SL data transmission between the second terminal and the first terminal, the CQI and/or the CSI refers to channel quality between the second terminal and the first terminal. On the other hand, if the first transmission resource allocated to the second terminal is for SL data transmission between the second terminal and a third terminal, the CQI and/or the CSI refers to channel quality between the second terminal and the third terminal.

The first resource selection window is determined as follows. The first terminal determines the first resource selection window according to pre-configuration information. Or, the first terminal determines the first resource selection window according to network configuration information. Or, the first terminal determines the first resource selection window according to configuration information received from a third terminal.

The pre-configuration information, the network configuration information, or the configuration information received from the third terminal may include at least one of: resource size of each transmission resource in the first resource selection window, time domain start position information of the first resource selection window, time domain end position information of the first resource selection window, time domain length information of the first resource selection window, frequency domain start position information of the first resource selection window, frequency domain end position information of the first resource selection window, frequency domain length information of the first resource selection window.

Considering that in SL transmission, the interference environment around each terminal is different, the available transmission resource obtained by the second terminal through sensing may be different from the available transmission resource obtained by the first terminal through sensing. In order to assist the first terminal in resource allocation, the second terminal may indicate to the first terminal one or more available resources sensed by the second terminal. For instance, the second terminal transmits a candidate transmission resource indicator to the first terminal, where the candidate transmission resource indicator is indicative of one or more available transmission resource.

Optionally, the candidate transmission resource indicator is indicative of the quantity of available transmission resources, time-frequency position information of each available transmission resource, and the like.

Optionally, the one or more available resources are those selected in the first resource selective window. The first resource selection window is determined according to pre-configuration information, network configuration information, or configuration information received from a third terminal.

Optionally, some or all of parameters of the first resource selection window are configured by the first terminal, configured by the network, configured by other devices, or preconfigured.

In the above scheme, the first information can be carried by a third SL transmission channel. That is, the first terminal receives the third SL transmission channel transmitted by the second terminal, where the first information is carried by the third SL transmission channel. The third SL transmission channel may be different from or the same as the first SL transmission channel.

Figure 6:
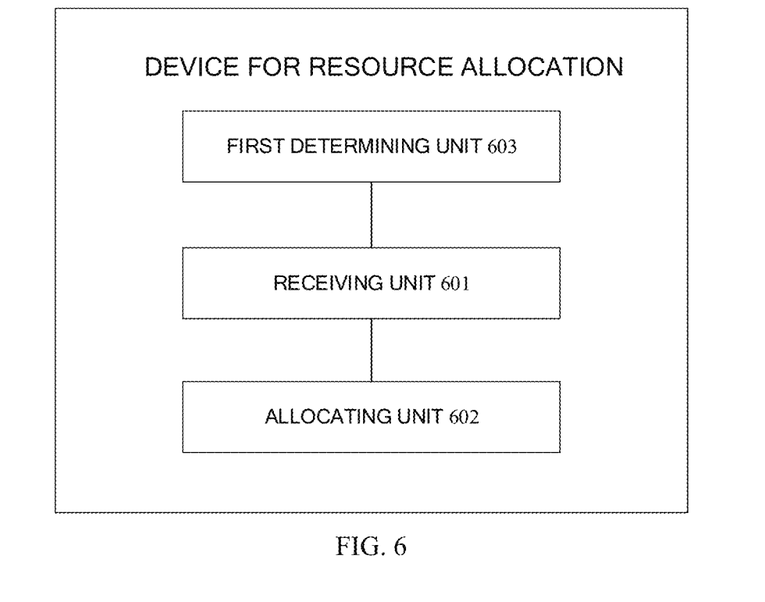
FIG. 6 is a schematic structural diagram illustrating a device for resource allocation according to embodiments of the disclosure.

FIG. 6 is a schematic structural diagram illustrating a device for resource allocation according to embodiments of the disclosure. As illustrated in FIG. 6, the device for resource allocation includes a receiving unit 601 and an allocating unit 602. The receiving unit 601 is configured to receive BSR information from a second terminal, and the allocating unit 602 is configured to allocate a first transmission resource to the second terminal.

In one embodiment, the allocating unit 602 is configured to allocate the first transmission resource to the second terminal based on the BSR information.

In one embodiment, the receiving unit 601 is configured to receive a first SL transmission channel transmitted by the second terminal, where the BSR information is carried by the first SL transmission channel.

In one embodiment, the first SL transmission channel is a first SL control channel, and the BSR information is carried by first SL control information that is carried in the first SL control channel.

In one embodiment, the first SL control information carries a first information field, and the first information field is for indicating that the first SL control information carries the BSR information.

In one embodiment, the first SL control information carries a second information field, and the second information field is for indicating the BSR information.

In one embodiment, the first SL transmission channel is a first SL data channel, and the BSR information is carried by data that is carried in the first SL data channel.

In one embodiment, the first SL control information carries a third information field, and the third information field is for indicating that the first SL control information carries SR information.

In one embodiment, the first SL control information carries a fourth information field, and the fourth information field is for indicating the SR information.

In one embodiment, the SR information is carried by data that is carried in the first SL data channel.

In one embodiment, the receiving unit 601 is further configured to receive a second SL transmission channel transmitted by the second terminal, and the SR information is carried by the second SL transmission channel.

In one embodiment, the second SL transmission channel is a second SL control channel, and the SR information is carried by second SL control information in the second SL control channel.

In one embodiment, the second SL control information carries a fifth information field, and the fifth information field is for indicating that the second SL control information carries the SR information.

In one embodiment, the second SL control information carries a sixth information field, and the sixth information field is for indicating the SR information.

In one embodiment, the second SL transmission channel is second SL data channel, and the SR information is carried by data in the second SL data channel.

In one embodiment, the second SL transmission channel is a first sequence, and the first sequence is for indicating the SR information.

In one embodiment, the first sequence is generated based on at least one of: ID of the first terminal, ID of the second terminal, or group ID of a group to which the first terminal and the second terminal belong.

In one embodiment, the device further includes a first determining unit 603. The first determining unit 603 is configured to determine the second transmission resource. The receiving unit 601 is configured to receive, on the second transmission resource, the first SL transmission channel transmitted by the second terminal.

In one embodiment, the first determining unit 603 is configured to determine the second transmission resource according to one of: pre-configuration information; network configuration information; or resource configuration information received from a third terminal. Alternatively, the first determining unit 603 is configured to determine a transmission resource, which is allocated to the second terminal according to the SR information received from the second terminal, as the second transmission resource.

In one embodiment, the receiving unit 601 is further configured to receive first information from the second terminal, where the first information comprises at least one of: CQI, CSI, MCS, or candidate transmission resource indicator. The candidate transmission resource indicator is indicative of available transmission resource that is in a first resource selection window.

In one embodiment, if the first transmission resource allocated to the second terminal is for SL data transmission between the second terminal and the first terminal, the CQI and/or the CSI refers to channel quality between the second terminal and the first terminal. If the first transmission resource allocated to the second terminal is for SL data transmission between the second terminal and a third terminal, the CQI and/or the CSI refers to channel quality between the second terminal and the third terminal.

In one embodiment, the device further includes a second determining unit. The second determining unit is configured to determine the first resource selection window according to one of: pre-configuration information; network configuration information; or configuration information received from a third terminal.

In one embodiment, the receiving unit 601 is configured to receive a third SL transmission channel transmitted by the second terminal, where the first information is carried by the third SL transmission channel.

Those skilled in the art should understand that the relevant description of the device for resource allocation in the embodiments can be understood with reference to the relevant description of the method for resource allocation of the embodiments.

Figure 7:
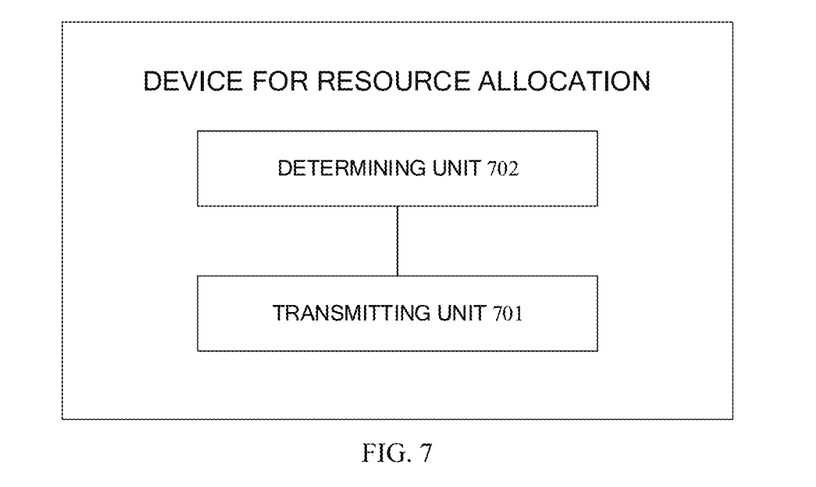
FIG. 7 is another schematic structural diagram illustrating a device for resource allocation according to embodiments of the disclosure.

FIG. 7 is another schematic structural diagram illustrating a device for resource allocation according to embodiments of the disclosure. As illustrated in FIG. 7, the device for resource allocation includes a transmitting unit 701. The transmitting unit 701 is configured to transmit BSR information to a first terminal, and the BSR information is used for the first terminal to allocate a first transmission resource to the second terminal.

In one embodiment, the transmitting unit 701 is configured to transmit a first SL transmission channel to the first terminal, where the BSR information is carried by the first SL transmission channel.

In one embodiment, the first SL transmission channel is a first SL control channel, and the BSR information is carried by first SL control information that is carried in the first SL control channel.

In one embodiment, the first SL control information carries a first information field, and the first information field is for indicating that the first SL control information carries the BSR information.

In one embodiment, the first SL control information carries a second information field, and the second information field is for indicating the BSR information.

In one embodiment, the first SL transmission channel is a first SL data channel, and the BSR information is carried by data that is carried in the first SL data channel.

In one embodiment, the first SL control information carries a third information field, and the third information field is for indicating that the first SL control information carries SR information.

In one embodiment, the first SL control information carries a fourth information field, and the fourth information field is for indicating the SR information.

In one embodiment, the SR information is carried by data that is carried in the first SL data channel.

In one embodiment, the transmitting unit 701 is further configured to transmit a second SL transmission channel, where the SR information is carried by the second SL transmission channel.

In one embodiment, the second SL transmission channel is a second SL control channel, and the SR information is carried by second SL control information in the second SL control channel.

In one embodiment, the second SL control information carries a fifth information field, and the fifth information field is for indicating that the second SL control information carries the SR information.

In one embodiment, the second SL control information carries a sixth information field, and the sixth information field is for indicating the SR information.

In one embodiment, the second SL transmission channel is second SL data channel, and the SR information is carried by data in the second SL data channel.

In one embodiment, the second SL transmission channel is a first sequence, and the first sequence is for indicating the SR information.

In one embodiment, the first sequence is generated based on at least one of: ID of the first terminal, ID of the second terminal, or group ID of a group to which the first terminal and the second terminal belong.

In one embodiment, the device for resource allocation further includes a determining unit 702. The determining unit 702 is configured to determine a second transmission resource. The transmitting unit 701 is configured to transmit the first SL transmission channel to the first terminal on the second transmission resource.

In one embodiment, the determining unit 702 is configured to select the second transmission resource independently, or determine the second transmission resource according to one of: pre-configuration information, network configuration information, or resource configuration information received from a third terminal. Alternatively, the determining unit 702 is configured to determine a transmission resource, which is allocated to the first terminal according to SR information received from the first terminal, as the second transmission resource.

In one embodiment, the transmitting unit 701 is further configured to transmit first information to the first terminal. The first information comprises at least one of: CQI, CSI, MCS, or candidate transmission resource indicator. The candidate transmission resource indicator is indicative of available transmission resource that is in a first resource selection window.

In one embodiment, if the first transmission resource allocated to the second terminal is for SL data transmission between the second terminal and the first terminal, the CQI and/or the CSI refers to channel quality between the second terminal and the first terminal. If the first transmission resource allocated to the second terminal is for SL data transmission between the second terminal and a third terminal, the CQI and/or the CSI refers to channel quality between the second terminal and the third terminal.

In one embodiment, the first resource selection window is determined according to one of: pre-configuration information, network configuration information, or configuration information transmitted by a third terminal.

In one embodiment, the transmitting unit 701 is configured to transmit a third SL transmission channel to the first terminal, where the first information is carried by the third SL transmission channel.

Those skilled in the art should understand that the relevant description of the device for resource allocation in the embodiments can be understood with reference to the relevant description of the method for resource allocation of the embodiments.

Figure 8:
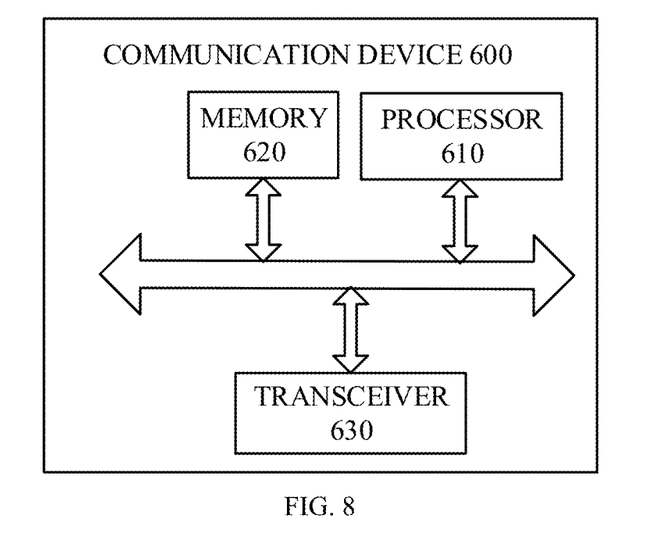
FIG. 8 is a schematic structural diagram illustrating communication equipment according to embodiments of the disclosure.

FIG. 8 is a schematic structural diagram of a communication device 600. The communication device can be a terminal or a RSU. The communication device 600 illustrated in FIG. 8 includes a processor 610. The processor 610 is configured to invoke and execute computer programs stored in a memory to perform the method for resource allocation provided herein.

As illustrated in FIG. 8, the communication device 600 includes a memory 620. The processor 610 is configured to invoke and execute computer programs stored in the memory 620 to perform the method for resource allocation provided herein.

The memory 620 can be independent from the processor 610 or can be integrated into the processor 610.

Optionally, as illustrated in FIG. 8, the communication device 600 may further includes a transceiver 630. The processor 610 can control the transceiver 630 to communicate with other devices, specifically, to transmit information or data to other devices, or to receive information or data from other devices.

The transceiver 630 may include a transmitter and a receiver. The transceiver 630 may include antennas, the number of which may be one or more.

The communication device 600 may be the network device provided herein, and can realize corresponding processes realized by the network device in each method of the embodiments. For the sake of brevity, it will not be repeated here.

Optionally, the communication device 600 may be mobile terminal/terminal provided herein, and can realize corresponding processes realized by the mobile terminal/terminal in each method of the embodiments. For the sake of brevity, it will not be repeated here.

Figure 9:
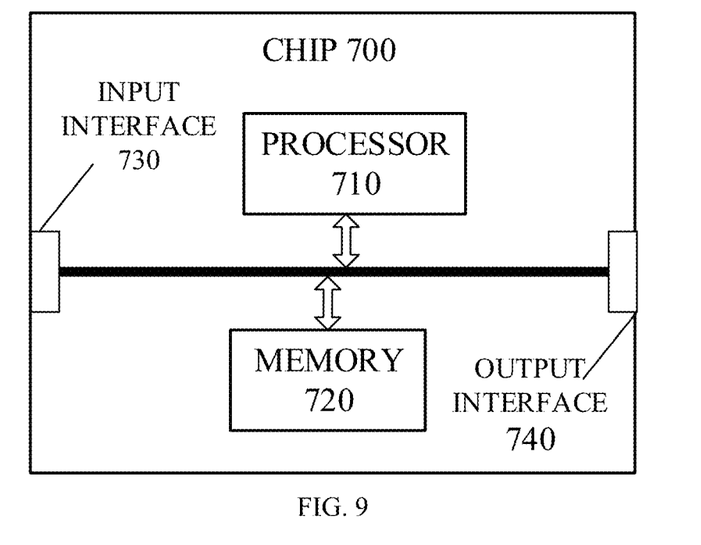
FIG. 9 is a schematic structural diagram illustrating a chip according to embodiments of the disclosure.

FIG. 9 is a schematic structural diagram of a chip according to embodiments. The chip 700 illustrated in FIG. 9 includes a processor 710. The processor 710 is configured to invoke and execute computer programs stored in a memory to perform the method for resource allocation provided herein.

As illustrated in FIG. 9, the chip 700 includes a memory 720. The processor 710 is configured to invoke and execute computer programs stored in the memory 720 to perform the method for resource allocation provided herein.

The memory 720 can be independent from the processor 710 or can be integrated into the processor 710.

The chip 700 may further includes an input interface 730. The processor 710 can control the input interface 730 to communicate with other devices or chips, for example, to obtain information or data which is transmitted by other devices or chips.

The chip 700 may further includes an output interface 740. The processor 710 can control the output interface 740 to communicate with other devices or chips, for example, to output information or data to other devices or chips.

The chip is applicable to the network device provided herein, and can realize corresponding processes realized by the network device in each method of the embodiments. For the sake of brevity, it will not be repeated here.

The chip is applicable to the mobile terminal/terminal provided herein, and can realize corresponding processes realized by the mobile terminal/terminal in each method of the embodiments. For the sake of brevity, it will not be repeated here.

It should be noted that the "chip" mentioned in the embodiments can also be referred to as system level chip, system chip, chip system, or system on chip, and the like.

Figure 10:
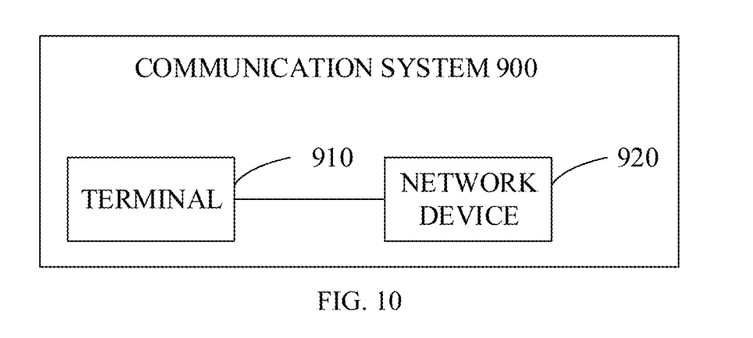
FIG. 10 is a schematic block diagram illustrating a communication system according to embodiments of the disclosure.

FIG. 10 is a schematic block diagram of a communication system 900 according to embodiments. As illustrated in FIG. 10, the communication system 900 includes a terminal 910 and the network device 920.

The terminal 910 is configured to realize corresponding functions realized by the terminal in the above method, and the network device 920 is configured to to realize corresponding functions realized by the network device in the above method. For the sake of brevity, it will not be repeated here.

The processor in embodiments may be an integrated circuit chip with signal processing capabilities. During implementation, each step of the foregoing method may be completed by an integrated logic circuit of hardware or an instruction in the form of software in the processor. The processor may be a general-purpose processor, a digital signal processor (DSP), other programmable logic devices (PLD), discrete gates or transistor logic devices, discrete hardware components, or the like. The methods, steps, and logic blocks disclosed in implementations can be implemented or executed by the processor. The general purpose processor may be a microprocessor or the any conventional processor or the like. The steps of the method disclosed in embodiments may be directly performed by a hardware decoding processor, or may be performed by hardware and software modules in the decoding processor. The software module can be in a random access memory (RAM), flash memory, read only memory (ROM), programmable ROM (PROM), electrically erasable programmable memory, registers, or other mature storage medium in the field. The storage medium is in a memory. The processor reads information in the memory, and completes the steps of the method described above with the hardware thereof The memory in the embodiment may be a volatile memory or a non-volatile memory, or may include both a volatile memory and a non-volatile memory. The non-volatile memory can be ROM, PROM, erasable PROM (EPROM), electrically erasable EPROM (EEPROM), or flash memory. The volatile memory can be RAM, which is used as an external cache.

By way of example rather than limitation, many forms of RAM are available. Examples of RAM include static RAM (SRAM), dynamic RAM (DRAM), Synchronous DRAM (SDRAM), double data rate SDRAM (DDR SDRAM), Enhanced SDRAM (ESDRAM), synchlink DRAM (SLDRAM), and direct rambus RAM (DR RAM). It should be noted that the memories of the systems and methods described herein are intended to include, but are not limited to, these and any other suitable types of memory.

It should be understood that the above memory is illustrative rather than restrictive. For example, the memory in the embodiments may also be SRAM, DRAM, SDRAM, DDR SDRAM, ESDRAM, SLDRAM, DR RAM, and the like. That is to say, the memory in the embodiments is intended to include but not limited to these and any other suitable types of memory.

According to an embodiment, a computer-readable storage medium for storing computer programs is also provided.

The computer-readable storage medium can be applied to the network device in the embodiment, and the computer program causes a computer to execute the corresponding processes realized by the network device in the methods of the embodiments. For the sake of brevity, it will not be repeated here.

The computer-readable storage medium can be applied to the mobile terminal/terminal in the embodiment, and the computer program causes a computer to execute the corresponding processes realized by the mobile terminal/terminal in the methods of the embodiments. For the sake of brevity, it will not be repeated here.

According to an embodiment, a computer program product is provided. The computer program product includes computer program instructions.

The computer program product can be applied to the network device in the embodiment, and the computer program instruction causes a computer to execute the corresponding processes realized by the network device in the methods of the embodiments. For the sake of brevity, it will not be repeated here.

The computer program product can be applied to the mobile terminal/terminal in the embodiment, and the computer program instruction causes a computer to execute the corresponding processes realized by the mobile terminal/terminal in the methods of the embodiments. For the sake of brevity, it will not be repeated here.

According to an embodiment, a computer program is provided.

The computer program can be applied to the network device in embodiments. When running on a computer, the computer program causes the computer to execute the corresponding processes realized by the network device in the methods of the embodiments. For the sake of brevity, it will not be repeated here.

The computer program can be applied to the mobile terminal/terminal in embodiments. When running on a computer, the computer program causes the computer to execute the corresponding processes realized by the mobile terminal/terminal in the methods of the embodiments. For the sake of brevity, it will not be repeated here.

Those of ordinary skill in the art can realize that the units and algorithm steps of each example described in connection with the embodiments disclosed herein can be implemented in electronic hardware or in a combination of computer software and electronic hardware. Whether these functions are implemented in hardware or software depends on the specific application and design constraints of the technical solution. Professionals may use different methods to implement the described functions for each specific application, but such implementation shall not be considered beyond the scope of this application.

Those skilled in the art can clearly understand that for the convenience and conciseness of the description, the specific working process of the system, device, and unit described above can refer to the corresponding process in the embodiments of the above methods, and will not be repeated here.

It should be understood that the system, device, and method disclosed in the embodiments provided herein can be realized in other ways. For example, the device embodiment described above is only exemplary. For example, the division of the units is only a logical function division, and there can be other division methods in actual implementations, for example, multiple units or components can be combined or integrated into another system, or some features can be ignored or not implemented. The coupling or direct coupling or communication connection shown or discussed may be indirect coupling or communication connection through some interfaces, devices or units, and may be in the form of electrical, mechanical or other forms.

The units described as separated components may be or may not be physically separated, and the component displayed as a unit may be or may not be a physical unit, that is, they may be located in the same place or distributed over a plurality of network units. Some or all units can be selected according to actual needs to realize the purpose of the embodiments.

In embodiments, each functional unit can be integrated in to one processing unit, or each unit may exist independently, or two or more units may be integrated in to one unit.

If the functions are implemented in the form of software function units and are sold or used as independent products, they can be stored in a computer readable storage medium. Based on such understanding, the technical solution of the application can be embodied in the form of software products in essence or the part that contributes to the prior art can be embodied in the form of software products. The computer software product is stored in a storage medium and includes instructions. The instructions can cause a computer device (which may be a personal computer, a server, or a network device, etc.) to perform all or part of the steps of the method described in embodiments. The storage medium includes U-disk, mobile hard disk, ROM, RAM, disk, optical disk, and other medium that can store program codes. The above is only specific implementations of the disclosure, and the protection scope of the disclosure is not limited thereto. Any technical personnel familiar with the technical field can easily think of any change or replacement within the technical scope disclosed by this application, which shall be included in the protection scope of the application. Therefore, the protection scope of the disclosure shall be subjected to the protection scope of the claims.

What is claimed is:

1. A method for resource allocation, comprising:
   receiving, by a first terminal, buffer status report (BSR) information from a second terminal;
   receiving, by the first terminal, first information from the second terminal, wherein the first information comprises a candidate transmission resource indicator, wherein the candidate transmission resource indicator is for indicating available transmission resource that is in a first resource selection window; and
   allocating, by the first terminal, a first transmission resource to the second terminal based on the BSR information and the first information.

2. The method of claim 1, wherein receiving, by the first terminal, BSR information from the second terminal comprises:
   receiving, by the first terminal, first sidelink (SL) transmission channel transmitted by the second terminal, wherein the BSR information is carried by the first SL transmission channel.

3. The method of claim 2, wherein the first SL transmission channel is a first SL control channel, and the BSR information is carried by first SL control information that is carried in the first SL control channel.

4. The method of claim 2, wherein the first SL transmission channel is a first SL data channel, and the BSR information is carried by data that is carried in the first SL data channel.

5. The method of claim 3, wherein the first SL control information carries a third information field, and the third information field is for indicating that the first SL control information carries scheduling request (SR) information.

6. The method of claim 3, wherein the first SL control information carries a fourth information field, and the fourth information field is for indicating SR information.

7. The method of claim 4, wherein SR information is carried by data that is carried in the first SL data channel.

8. The method of claim 1, further comprising:
   receiving, by the first terminal, a second SL transmission channel transmitted by the second terminal, wherein SR information is carried by the second SL transmission channel.

9. The method of claim 1,
   wherein the first information further comprises at least one of: a channel quality indicator (CQI), channel state information (CSI), or a modulation and coding scheme (MCS).

10. The method of claim 9, further comprising:
    determining, by the first terminal, the first resource selection window according to one of:
    pre-configuration information;
    network configuration information; or
    configuration information received from a third terminal.

11. A method of resource allocation, comprising:
    transmitting, by a second terminal, buffer status report (BSR) information to a first terminal, the BSR information being used for the first terminal to allocate a first transmission resource to the second terminal; and
    transmitting, by the second terminal, first information to the first terminal, wherein the first information comprises a candidate transmission resource indicator, wherein the candidate transmission resource indicator is for indicating available transmission resource that is in a first resource selection window.

12. A device for resource allocation, comprising:
    a transceiver;
    at least one processor; and
    a memory storing instructions which, when executed by the at least one processor, cause the transceiver to:
      receive buffer status report (BSR) information from a terminal; and
      receive first information from the terminal, wherein the first information comprises a candidate transmission resource indicator, wherein the candidate transmission resource indicator is for indicating available transmission resource that is in a first resource selection window;
    the instructions, when executed by the at least one processor, cause the processor to:
      allocate a first transmission resource to the terminal based on the BSR information and the first information.

13. The device of claim 12, wherein the transceiver is configured to receive a first sidelink (SL) transmission channel transmitted by the terminal, wherein the BSR information is carried by the first SL transmission channel.

14. The device of claim 13, wherein the first SL transmission channel is a first SL control channel, and the BSR information is carried by first SL control information that is carried in the first SL control channel.

15. The device of claim 13, wherein the first SL transmission channel is a first SL data channel, and the BSR information is carried by data that is carried in the first SL data channel.

16. The device of claim 14, wherein the first SL control information carries a third information field, and the third information field is for indicating that the first SL control information carries scheduling request (SR) information.

17. The device of claim 14, wherein the first SL control information carries a fourth information field, and the fourth information field is for indicating SR information.

18. The device of claim 15, wherein SR information is carried by data that is carried in the first SL data channel.

19. The device of claim 12, wherein the transceiver is further configured to receive a second SL transmission channel transmitted by the terminal, wherein SR information is carried by the second SL transmission channel.

20. The device of claim 12, wherein the first information further comprises at least one of: a channel quality indicator (CQI), channel state information (CSI), or a modulation and coding scheme(MCS).

* * * * *